United States Patent Office 3,349,087
Patented Oct. 24, 1967

3,349,087
THIENO-BENZOTHIAZINE DERIVATIVES
Jany Renz, Jean-Pierre Bourquin, and Hans Winkler, Basel, Pierre Gagnaux, Allschwil, Simon Guldimann and Leo Ruesch, Basel, and Gustav Schwarb, Allschwil, Switzerland, assignors to Sandoz Ltd. (also known as Sandoz A.G.), Basel, Switzerland
No Drawing. Filed Sept. 22, 1965, Ser. No. 489,382
Claims priority, application Switzerland, Oct. 1, 1964, 12,765/64; Oct. 21, 1964, 13,634/64; Dec. 23, 1964, 16,634/64; Apr. 1, 1965, 4,496/65, 4,497/65; Aug. 18, 1965, 11,638/65, 11,639/65
23 Claims. (Cl. 260—243)

ABSTRACT OF THE DISCLOSURE

Thieno-benzothiazines of Formula I

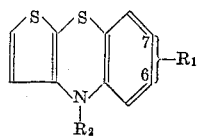

are prepared by cyclization of compounds of Formula II

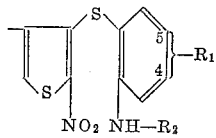

The reaction is conduced by heating a sulfide of Formula II in a suspension of sodium or potassium carbonate in dimethyl formamide, preferably with the addition of copper, until the evolution of nitrogen oxide ceases. $R_1$ in the above formula may be hydrogen, chlorine or bromine, alkoxy, alkylmercapto, alkylsulphonyl or alkylsulphinyl; $R_2$ is either a hydrogen or an acyl radical. The compounds of Formula I have value as anthelmintics.

Methods for the preparation of the sulfides of Formula II are described.

---

The present invention relates to new heterocyclic compounds and a process for their production.

The present invention provides heterocyclic compounds of general Formula I,

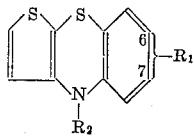

in which $R_1$ signifies a hydrogen, chlorine or bromine atom or an alkoxy, alkylmercapto, alkylsulphonyl or alkylsulphinyl radical, each containing from 1 to 4 carbon atoms inclusive, an aliphatic acyl radical containing from 2 to 4 carbon atoms inclusive, the trifluoromethyl or the cyano radical, and
$R_2$ signifies a hydrogen atom or an aliphatic acyl radical containing from 1 to 4 carbon atoms inclusive or the benzoyl radical.

The present invention further provides a process for the production of compounds I, charcterized in that a compound of general Formula II,

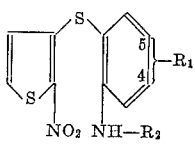

in which $R_1$ and $R_2$ have the above significance, is heated either in a suspension of carbonate or bicarbonate of sodium or potassium in dimethyl formamides to a temperature of 60–155° C. or with the addition of sodium hydroxide or potassium hydroxide in acetone to the boil, a compound I resulting in which $R_2$ signifies a hydrogen atom, which compound I is, when a compound I, in which $R_2$ signifies an aliphatic acyl radical of 1 to 4 carbon atoms inclusive or the benzoyl radical, is required, acylated in manner known per se.

The reaction for the intramolecular ring closure is preferably effected in the presence of copper bronze though this is not essential; the reaction time is dependent upon the reaction temperature, that is preferably between 10 minutes and 2½ hours. The intramolecular ring closure produced by this reaction is accompanied by a transposition which according to the literature has hitherto only been observed in the case of diphenyl ethers and diphenyl sulphides and which is called Smiles' transposition. It was, however, hitherto unknown and not to be expected that the Smiles' transposition could also take place in the case of 3-thienyl-phenyl sulphides, because of the difference of reactivity between positions $\alpha$ and $\beta$ of the thiophene ring and also as, in view of the increased sensitivity of the thiophene derivatives as opposed to the benzene derivatives, it was by no means certain that the compounds could withstand the relatively high temperatures required for this reaction.

The process of the invention may, however, also be utilized for the production of compounds of the general Formula VIII,

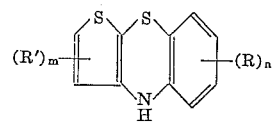

VIII in which each of

R and R′ signifies a halogen atom, an alkyl, alkoxy, alkylmercapto, acyl, acylamino, dialkylamino, carbalkoxy, nitro, nitroso, trifluoromethyl, trifluoromethylthio, trifluoroacetyl or cyano radical,
$n$ signifies an integer from 0 to 4 inclusive, and
$m$ signifies an integer from 0 to 2 inclusive, from compounds of general Formula IX,

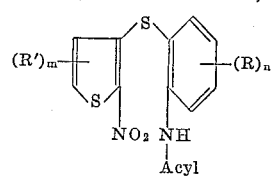

IX in which

R, R′, $n$ and $m$ have the above significance, and
Acyl signifies an aliphatic or aromatic acyl radical.

It is to be understood that when either $n$ or $m$ signifies an integer greater than 1, the various substituents R and R′ need not necessarily be identical.

One method of effecting the process of the invention consists in that a compound II in dimethyl formamide is heated to approximately 120–150° C. with finely pulverized potassium carbonate and copper bronze for 15 minutes to one hour. After cooling the reaction mixture, the corresponding compound I ($R_2$=H) is isolated and purified in manner known per se. The resulting compound I ($R_2$=H) may optionally be converted into its acyl derivative by acylation with an acid or reactive acid derivative (e.g. formic acid, acid anhydrides or chlorides).

The compounds II used as starting materials may be obtained in that a compound of general Formula III,

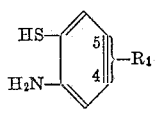

in which $R_1$ has the above significance, preferably in the form of its alkali metal salts, is condensed with a compound of general Formula IV,

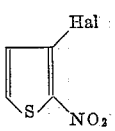

in which Hal signifies a chlorine, bromine or iodine atom, and the resulting compound II, in which $R_2$ signifies a hydrogen atom, is then optionally converted into its corresponding acyl derivatives with known acylating agents (e.g. formic acid, acid anhydrides or chlorides).

Compounds III, insofar as they are unknown, may be produced by the following process: A compound of general Formula V,

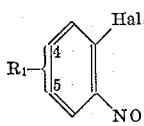

in which $R_1$ and Hal have the above significance, is treated with an alkali metal sulphide and sulphur powder and the resulting compound of general Formula VI,

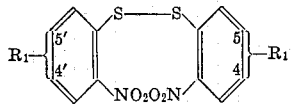

in which $R_1$ has the above significance, is reduced in manner known per se into a compound of the general Formula VII,

in which $R_1$ has the above significance. By splitting the disulphide bridge of this compound in alcoholic solution with strong alkali metal bases the alkal metal salts of compounds III are obtained, from which the free thiophenols may be produced in manner known per se.

Compounds I, in which $R_1$ signifies an alkylsulphinyl radical of from 1 to 4 carbon atoms inclusive and $R_2$ signifies a hydroyen atom or an aliphatic acyl radical containing from 1 to 4 carbon atoms inclusive or the benzoyl radical, may also be obtained in that a compound I, in which $R_1$ signifies an alkylmercapto radical of from 1 to 4 carbon atoms and $R_2$ signifies an aliphatic acyl radical of from 1 to 4 carbon atoms or the benzoyl radical, is oxidized in manner known per se, e.g. with hydrogen peroxide in boiling alcoholic solution, a compound I, in which $R_1$ signifies an alkylsulphinyl radical of from 1 to 4 carbon atoms and $R_2$ signifies an aliphatic acyl radical of from 1 to 4 carbon atoms or the benzoyl radical, resulting, and this compound is saponified in manner known per se when a compound I, in which $R_1$ signifies an alkylsulphinyl radical and $R_2$ signifies hydrogen, is required.

Compounds II, in which $R_1$ in the 5-position signifies a bromine atom, may also be obtained in that a compound II, in which $R_1$ signifies a hydrogen atom and $R_2$ signifies an aliphatic acyl radical of from 1 to 4 carbon atoms or the benzoyl radical, is brominated in manner known per se, e.g. with elementary bromine, a compound I, in which $R_1$ signifies a bromine atom and $R_2$ signifies an aliphatic acyl radical of from 1 to 4 carbon atoms or the benzoyl radical, resulting, and this compound is saponified in manner known per se when a compound I, in which $R_1$, signifies a bromine atom and $R_2$ signifies hydrogen, is required.

Compounds I are crystalline at room temperature. They may be used as anthelmintics. They may furthermore be used as intermediates for the synthesis of pharmaceuticals.

The compounds of the invention may be used as pharmaceuticals on their own or in the form of appropriate medicinal preparations for enteral administration. In order to produce suitable medicinal preparations the compounds are worked up with organic or inorganic adjuvants which are inert and physiologically acceptable. Examples of such adjuvants are as follows:

Tablets and dragées—Lactose, starch, talc and stearic acid;
Syrups—Solutions of cane sugar, invert sugar and glucose;
Suppositories—Natural or hardened oils and waxes.

The preparations may furthermore contain suitable preserving, stabilizing and wetting agents, solubilizers, sweetening and colouring substances and flavourings.

In the Formula I the substituent $R_1$ is either in the 6- or 7-position of the thieno-benzothiazine elementary structure, in Formulae II, III and V in the 4- or 5-position of the benzene ring and in Formulae VI and VII in the 4- or 5-position or the 4'- or 5'-position.

The term "in manner known per se" as utilized herein designates methods in use or described in the literature on the subject.

In the following non-limitative examples all temperatures are indicated in degrees centigrade and are corrected.

EXAMPLE 1

*4H-thieno[2,3-b][1,4]benzothiazine*

(a) (2-NITRO-3-THIENYL)-2-AMINOPHENYL-SULPHIDE

A total of 173 g. of 3-bromo-2-nitro-thiophene (melting point 81–83°) is added portionwise at 60° to a solution of 104 g. of o-aminothiophenol (boiling point 234°) and 30 g. of sodium hydroxide in 500 cc. of methanol and the mixture is kept at 60° for a further 1½ hours. Cooling, filtration and drying are effected. After recrystallizing twice, each time from 700 cc. of ethanol pure (2-nitro-3-thienyl)-2-aminophenyl - sulphide, having a melting point of 109–111°, is obtained.

(b) (2-NITRO-3-THIENYL)-2-ACETAMIDOPHENYL-SULPHIDE 50 g. of acetic anhydride are added dropwise during the course of 5 minutes to a boiling mixture of 60.0 g. of (2-nitro-3-thienyl)-2-aminophenyl-sulphide in 180 cc. of toluene and boiling is then effected for a further 15 minutes. After cooling well filtration and washing out with toluene are effected. After crystallizing from 650 cc. of acetone pure (2-nitro-3-thienyl)-2-acetamidophenyl-sulphide, having a melting point of 159–161°, is obtained.

(c) 4H-THIENO[2,3-b][1,4]BENZOTHIAZINE

A mixture of 80 g. of (2-nitro-3-thienyl)-2-acetamidophenyl-sulphide, 80 g. of finely pulverized potassium carbonate, 5 g. of copper bronze and 600 cc. of dimethyl formamide is heated in an atmosphere of nitrogen gas at an oil bath temperature of 150° for half an hour, i.e. until nitrogen monoxide evolution stops. The reaction mixture is poured on 2 litres of water whilst warm, is cooled, altered and dried. The crude material is extracted in a Soxhlet apparatus with 500 cc. of ether for 2½ hours. After evaporating the ether extract the evaporation residue is crystallized twice, each time from 125 cc. of chloroform. The resulting pure 4H-thieno[2,3-b][1,4]benzothiaiine has a melt point of 134–137°.

EXAMPLE 2

*4-acetyl-4H-thieno[2,3-b][1,4]benzothiazine*

10.0 g. of 4H-thieno [2,3-b][1,4]benzothiazine and 20.7 cc. of acetic anhydride are boiled at reflux for 3 hours at an oil bath temperature of 180°. After cooling dilution with 40 cc. of benzene and filtration are effected. After crystallizing twice, each time from 120 cc. of ethyl acetate, pure 4-acetyl-4H-thieno[2,3-b][1,4]benzothiazine, having a melting point of 161–163°, obtained.

EXAMPLE 3

*6-chloro-4H-thieno[2,3-b][1,4]benzothiazine*

(a) (2-NITRO-3-THIENYL)-2-AMINO-4-CHLORO-PHENYL-SULPHIDE

A total of 250 g. of 3-bromo-2-nitro-thiophene (melting point 81–83°) is added portionwise at 60° to a solution of 192 g. of 2-amino-4-chlorothiophenol (melting point 44–46°) and 48.2 g. of sodium hydroxide in 900 cc. of methanol and the mixture is kept at 60° for half an hour. Cooling, filtration and drying are effected. After recrystallizing twice, each time from a 3-fold quantity of ethyl acetate, pure (2-nitro-3-thienyl)-2-amino-4-chlorophenyl-sulphide, having a melting point of 165–167°, is obtained.

(b) (2-NITRO-3-THIENYL)-2-ACETAMIDO-4-CHLOROPHENYL-SULPHIDE 192 g. of acetic anhydride are added dropwise during the course of 5 minutes to a boiling mixture of 267 g. of (2-nitro-3-thienyl-3)-2-amino-4-chlorophenyl-sulphide in 800 cc. of toluene and boiling is subsequently effected for one hour. After cooling well filtration and washing out with toluene are effected. After crystallizing from a 10-fold quantity of acetone pure (2-nitro-3-thienyl)-2-acetamido-4-chlorophenyl-sulphide, having a melting point of 178–180°, is obtained.

(c) 6-CHLORO-4H-THIENO[2,3-b][1,4]BENZOTHIAZINE

A mixture of 96.5 g. of (2-nitro-3-thienyl)-2-acetamido-4-chlorophenyl-sulphide, 85 g. of finely pulverized potassium carbonate, 5 g. of copper bronze and 650 cc. of dimethyl formamide is heated in an atmosphere of nitrogen gas at an oil bath temperature of 150° for 40 minutes, i.e. until nitrogen monoxide evolution stops. The reaction mixture is poured on 2 litres of water whilst warm, is cooled, filtered and dried. The crude material is extracted in a Soxhlet apparatus with 350 cc. of ether for 3½ hours. After evaporating the ether extract the evaporation residue is recrystallized 4 times from chloroform and once from cyclohexane. The resulting pure 61chloro-4H-thieno[2,3-b][1,4]benzothiazine has a melting point of 167–170°.

EXAMPLE 4

*6-chloro-4-acetyl-4H-thieno[2,3-b][1,4]benzothiazine*

2.0 g. of 6-chloro-4H-thieno[2,3-b][1,4]benzothiazine and 3.55 cc. of acetic anhydride are boiled at reflux at an oil bath temperature of 180° for 3 hours. After evaporating in a water jet vacuum the evaporation residue is crystallized twice, each time from 20 cc. of ethyl acetate. Pure 6-chloro-4-acetyl-4H-thieno[2,3-b][1,4]benzothiazine has a melting point of 121–123°.

EXAMPLE 5

*6-methylmercapto-4H-thieno[2,3-b][1,4]benzothiazine*

(a) (2-NITRO-3-THIENYL)-2-AMINO-4-METHYL-MERCAPTO-PHENYL-SULPHIDE

A total of 416 g. of 3-bromo-2-nitrothiophene (melting point 81–83°) is added portionwise at 60° to a solution of 342 g. of 2-amino-4-methylmercapto-thiophenol (melting point 49–51°) and 80 g. of sodium hydroxide in 1.5 litres of methanol and the mixture is then kept at 60° for half an hour. Cooling, filtration and drying are effected. After recrystallizing twice, each time from a 4-fold quantity of ethyl acetate, pure (2-nitro-3-thienyl)-2-amino-4-methylmercapto-phenyl-sulphide, having a melting point of 136–138°, is obtained.

(b) (2-NITRO-3-THIENYL)-2-ACETAMIDO-4-METHYL-MERCAPTO-PHENYL-SULPHIDE 315 g. of acetic anhydride are added dropwise during the course of 15 minutes to a boiling mixture of 457 g. of (2-nitro-3-thienyl)-2-amino-4-methylmercapto-phenyl-sulphide in 1370 cc. of toluene and boiling is subsequently effected for 15 minutes. After cooling well filtration and washing out with toluene are affected. After crystallizing from a 25-fold quantity of acetone pure (2-nitro-3-thienyl)-2-acetamido-4-methylmercapto-phenyl-sulphide, having a melting point of 177–179°, is obtained.

(c) 6-METHYLMERCAPTO-4H-THIENO[2,3-b][1,4]BENZOTHIAZINE

A mixture of 100 g. of (2-nitro-3-thienyl)-2-acetamido-4-methylmercapto-phenyl-sulphide, 85 g. of finely pulverized potassium carbonate, 5 g. of copper bronze and 650 cc. of dimethyl formamide is heated in an atmosphere of nitrogen gas at an oil bath temperature of 150° for one hour, i.e. until nitrogen monoxide evolution stops. The reaction mixture is poured on 2 litres of water whilst warm, is cooled, filtered and dried. The crude material is extracted in a Soxhlet apparatus with 350 cc. of ether for 3 hours. After evaporating the ether extract the evaporation residue is recrystallized four times from chloroform. The resulting pure 6-methylmercapto-4H-thieno[2,3-b][1,4]benzothiazine has a melting point of 123–125°.

EXAMPLE 6

*6-methylmercapto-4-acetyl-4H-thieno[2,3-b][1,4]benzothiazine*

2.0 g. of 6-methylmercapto-4H-thieno[2,3-b][1,4]benzothiazine and 3.4 cc. of acetic anhydride are boiled at reflux for 3 hours at an oil bath temperature of 180°. After evaporating in a water jet vacuum the evaporation residue is crystallized twice, each time from 20 cc. of ethyl acetate. Pure 6-methylmercapto-4-acetyl-4H-thieno[2,3-b][1,4]benzothiazine has a melting point of 121–123°.

EXAMPLE 7

*7-bromo-4H-thieno[2,3-b][1,4]benzothiazine*

(a) (2-NITRO-3-THIENYL)-2-ACETAMIDO-5-BROMO-PHENYL-SULPHIDE 100 cc. of bromine are added dropwise to a solution of 193 g. of (2-nitro-3-thienyl)-2-acetamido-phenyl-sulphide in 800 cc. of dimethyl formamide at an internal temperature of 15–25° whilst stirring for 45 minutes and stirring is subsequently effected for a further 1½ hours at the same temperature. The reaction mixture is added to a solution of 250 g. of sodium pyrosulphite in 4 litres of water whilst stirring well. The precipitated material is filtered off, washed out well with water and dried. After recrystallizing from a 6-fold quantity of volume of acetone pure (2-nitro-3-thienyl)-2-acetamido-5-bromo-phenyl-sulphide, having a melting point of 178–180°, is obtained.

(b) 7-BROMO-4H-THIENO[2,3-b][1,4]BENZOTHIAZINE

A mixture of 60.0 g. of (2-nitro-3-thienyl)-2-acetamido-5-bromo-phenyl-sulphide, 60.0 g. of finely pulverized potassium carbonate, 3 g. of copper bronze and 450 cc. of dimethyl formamide is heated in an atmosphere of nitrogen gas at an oil bath temperature of 160° for 25 minutes, i.e. until nitrogen monoxide evolution stops. The reaction mixture is poured on 1.6 litres of water whilst warm, is cooled, filtered off and dried. The crude material is extracted in a Soxhlet apparatus with 350 cc. of ether for 3 hours. After evaporating the ether extract the evaporation residue is recrystallized once from chloroform and then from methanol. The resulting pure 7-bromo-4H-thieno[2,3-b][1,4]benzothiazine has an indefinite melting point: slow decomposition above 163°.

EXAMPLE 8

*7-bromo-4-acetyl-4H-thieno[2,3-b][1,4]benzothiazine*

3.0 g. of 7-bromo-4H-thieno[2,3-b][1,4]benzothiazine and 4.5 cc. of acetic anhydride are boiled at reflux at an oil bath temperature of 180° for 3 hours. After cooling evaporation is effected in a vacuum and the evaporation residue is recrystallized from 35 cc. of ethyl acetate whilst boiling. The resulting pure 7-bromo-4-acetyl-4H-thieno-[2,3-b][1,4]benzothiazine has a melting point of 128–130°.

EXAMPLE 9

*7-chloro-4H-thieno[2,3-b][1,4]benzothiazine*

(a) (2-NITRO-3-THIENYL)-2-AMINO-5-CHLORO-PHENYL-SULPHIDE

A total of 36.5 g. of 3-bromo-2-nitro-thiophene is added portionwise at 60° to a solution of 28 g. of 5,5'-dichloro-2,2'-diamino-diphenyl - disulphide (melting point 109–111°) [production see Farrington and Warburton, Austral. Journ. of Chemistry, 8, 549 (1955), wherein, however, the compound is described as 2-amino-5-chlorothiophenol] and 7.04 g. of sodium hydroxide in 130 cc. of methanol and the mixture is then kept at 60° for half an hour. Cooling, filtration and drying are effected. After recrystallizing twice, each time from a 4-fold quantity of ethylene chloride, pure (2-nitro-3-thienyl)-2-amino-5-chlorophenyl-sulphide, having a melting point of 158–160°, is obtained.

(b) (2-NITRO-3-THIENYL)-2-ACETAMIDO-5-CHLORO-PHENYL-SULPHIDE 10.8 g. of acetic anhydride are added dropwise during the course of 5 minutes to a boiling mixture of 15.0 g. of (2-nitro-3-thienyl)-2-amino-5 - chlorophenyl-sulphide in 45 cc. of toluene and boiling is subsequently effected for one hour. After cooling well filtration and washing out with toluene are effected. After crystallizing from an 85-fold quantity of 80% ethanol pure (2-nitro-3-thienyl) 2-acetamido-5-chlorophenyl-sulphide, having a melting point of 183–185°, is obtained.

(c) 7-CHLORO-4H-THIENO[2,3-b][1,4]BENZOTHIAZINE

A mixture of 15.0 g. of (2-nitro-3-thienyl)-2-acetamido-5-chloro-phenyl-sulphide, 15.0 g. of finely pulverized potassium carbonate, 1 g. of copper bronze and 120 cc. of dimethyl formamide is heated in an atmosphere of nitrogen gas at an oil bath temperature of 150° for 15 minutes, i.e. until nitrogen monoxide evolution stops. The reaction mixture is poured on 500 cc. of water whilst warm, is cooled, filtered and dried. The crude material is extracted in a Soxhlet apparatus for 3½ hours with 600 cc. of ether. After evaporating the ether extract the residue is recrystallized once from chloroform and twice from methanol. The resulting pure 7-chloro-4H-thieno[2,3-b][1,4]benzothiazine melts above 167° with slow decomposition (indefinite).

EXAMPLE 10

*7-chloro-4-acetyl-4H-thieno[2,3-b][1,4]benzothiazine*

3.0 g. of 7-chloro-4H-thieno[2,3-b][1,4]benzothiazine and 5.3 cc. of acetic anhydride are boiled at reflux for 3 hours at an oil bath temperature of 180°. After evaporating in a vacuum the evaporation residue is crystallized twice, each time from 15 cc. of ethyl acetate. The pure 7-chloro-4-acetyl-4H-thieno[2,3-b][1,4]benzothiazine has a melting point of 117–119°.

EXAMPLE 11

*6-methylsulphinyl-4H-thieno[2,3-b][1,4]benzothiazine*

(a) 6-METHYLSULPHINYL-4-ACETYL-4H-THIENO [2,3-b][1,4]BENZOTHIAZINE 3.9 cc. of hydrogen peroxide (35.6% by volume) are added dropwise whilst stirring during the course of half an hour to a boiling solution of 10.0 g. of 6-methylmercapto-4-acetyl-4H-thieno[2,3-b][1,4]benzothiazine in 120 cc. of ethanol and boiling is subsequently effected for a further 5 hours in a reflux condenser. 50 cc. of water are added to the reaction mixture and evaporation is effected in a vacuum until ethanol no longer distils off. The evaporation residue is extracted with 100 cc. of benzene, the benzene solution is washed out with 25 cc. of water and concentrated in a vacuum. The 6-methyl-sulphinyl-4-acetyl-4H-thieno[2,3-b][1,4]benzothiazine obtained as evaporation residue is worked up without isolation.

(b) 6-METHYLSULPHINYL-4H-THIENO[2,3-b][1,4] BENZOTHIAZINE

A solution of 12.1 g. of crude 6-methylsulphinyl-4-acetyl-4H-thieno[2,3-b][1,4]benzothiazine and 8.03 g. of potassium carbonate in 150 cc. of 90% aqueous methanol is boiled at reflux for 2 hours at an oil bath temperature of 120°. After the addition of 50 cc. of water evaporation is effected in a vacuum until all the methanol has been distilled off. The precipitated material is filtered off, dried and crystallized twice, each time from 600 cc. of ethanol. The resulting pure 6-methylsulphinyl-4H-thieno[2,3-b] [1,4]benzothiazine has a melting point of 239–241°.

EXAMPLE 12

*6-bromo-4H-thieno[2,3-b][1,4]benzothiazine*

(a) 2,2'-DIAMINO-4,4'-DIBROMO-DIPHENYL-DISULPHIDE 133.1 g. of hydrazine hydrate are slowly added dropwise at reflux temperature to a mixture of 195.8 g. of 2,2'-dinitro-4,4'-dibromo-diphenyl-disulphide and 1960 cc. of absolute ethanol. Boiling is subsequently effected for a further 5 hours and the reaction solution is then evaporated in a water jet vacuum at a bath temperature of 60°. The residue is recrystallized once from a 9-fold quantity of 80% aqueous ethanol and then thrice, each time from an 8-fold quantity of isopropyl alcohol. The pure 2,2'-diamino-4,4'-dibromo-diphenyl-disulphide has a melting point of 136–138°.

(b) (2-NITRO-3-THIENYL)-2-AMINO-4-BROMO-PHENYL-SULPHIDE

A total of 62.4 g. of 3-bromo-2-nitro-thiophene (melting point 81–83°) is added portionwise at 60° to a mixture of 60.9 g. of 2,2'-diamino-4,4'-dibromo-diphenyl-disulphide and 12.9 g. of sodium hydroxide in 220 cc. of methanol and the mixture is then kept at 60° for half an hour. Cooling, filtration and drying are effected. After recrystallizing thrice, each time from a 9-fold quantity of trichloroethylene, pure (2-nitro - 3 - thienyl)-2-amino-4-bromophenyl-sulphide, having a melting point of 163–165°, is obtained.

(c) (2-NITRO-3-THIENYL)-2-FORMAMIDO-4-BROMOPHENYL-SULPHIDE

A mixture of 106 g. of (2-nitro-3-thienyl)-2-amino-4-bromophenyl-sulphide and 550 cc. of approximately 98% concentrated formic acid is boiled at reflux for half an hour. Cooling, filtration and drying are effected. After recrystallizing twice, each time from a 45-fold quantity of chlorobenzene, pure (2-nitro-3-thienyl)-2-formamido-4-bromophenyl-sulphide, having a decomposition point of 238°, is obtained.

(d) 6-BROMO-4H-THIENO[2,3-b][1,4]BENZOTHIAZINE

A mixture of 7.5 g. of (2-nitro-3-thienyl)-2-formamido-4-bromophenyl-sulphide, 13.0 g. of finely pulverized potassium carbonate, 0.5 g. of copper bronze and 80 cc. of dimethyl formamide is heated in an atmosphere of nitrogen gas for 10 minutes at an oil bath temperature of 120°. The reaction mixture is then poured on 0.5 litre of water whilst warm, is cooled, filtered off and dried. The crude material is boiled at reflux for one hour together with 150 cc. of chloroform, filtration is effected and the filtrate is evaporated. After crystallizing from chloroform and then twice from isopropanol pure 6-bromo-4H-thieno-[2,3-b][1,4]benzothiazine, having a melting point of 170–172°, is obtained.

EXAMPLE 13

*6-bromo-4-acetyl-4H-thieno[2,3-b][1,4]benzothiazine*

1.0 g. of 6-bromo-4H-thieno[2,3-b][1,4]benzothiazine and 1.62 g. of acetic anhydride are boiled at reflux for 3 hours at an oil bath temperature of 180°. After evaporating in a water jet vacuum the evaporation residue is crystallized twice, each time from 5 cc. of ethyl acetate. Pure 6-bromo - 4 - acetyl-4H-thieno[2,3-b][1,4]benzothiazine has a melting point of 116–118°.

EXAMPLE 14

*6-methoxy-4H-thieno[2,3-b][1,4]benzothiazine*

(a) (2-NITRO-3-THIENYL)-2-AMINO-4-METHOXY-PHENYL-SULPHIDE

A total of 46.4 g. of 3-bromo-2-nitro-thiophene (melting point 81–83°) is added portionwise at 60° to a mixture of 42.7 g. of 3-amino-4-mercapto-anisole hydrochloride and 17.93 g. of sodium hydroxide in 330 cc. of methanol and the mixture is then kept at 60° for half an hour. Cooling, filtration and drying are effected. After recrystallizing twice, each time from a 4-fold quantity of chlorobenzene, pure (2-nitro-3-thienyl)-2-amino - 4 - methoxyphenyl-sulphide, having a melting point of 164–165°, is obtained.

(b) (2-NITRO-3-THIENYL)-2-FORMAMIDO-4-METHOXY-PHENYL-SULPHIDE

A mixture of 61.2 g. of (2-nitro-3-thienyl)-2-amino-4-methoxyphenyl-sulphide and 350 cc. of approximately 98% concentrated formic acid is boiled at reflux for half an hour. Cooling, filtration and drying are effected. After recrystallizing thrice, each time from a 35-fold quantity of methylethyl-ketone, pure (2-nitro-3-thienyl)-2-formamido-4-methoxyphenyl-sulphide, having a decomposition point of 204°, is obtained.

(c) 6-METHOXY-4H-THIENO[2,3-b][1,4]BENZOTHIAZINE

A mixture of 46.0 g. of (2-nitro-3-thienyl)-2- formamido-4-methoxyphenyl-sulphide, 90.0 g. of finely pulverized potassium carbonate, 2.5 g. of copper bronze and 400 cc. of dimethyl formamide is heated for 35 minutes at an oil bath temperature of 130°. The reaction mixture is poured on 2.0 litres of water whilst warm, is cooled, filtered and dried. The crude material is boiled at reflux for one hour together with 1.0 litre of chloroform, is filtered off and the filtrate is evaporated. 9 g. of the evaporation residue are dissolved in 50 cc. of chloroform and are adsorbed on a column with 250 g. of silica gel. The first 1000 cc. of chloroform eluate are discarded and the following 1000 cc. of chloroform eluate are evaporated. After crystallizing thrice from benzene pure 6-methoxy-4H-thieno[2,3-b][1,4]benzothiazine, having a melting point of 131–133°, is obtained.

EXAMPLE 15

*6-methoxy-4-acetyl-4H-thieno[2,3-b][1,4]benzothiazine*

1.0 g. of 6-methoxy-4H-thieno[2,3-b][1,4]benzothiazine and 1.95 g. of acetic anhydride are boiled at reflux for 3 hours at an oil bath temperature of 180°. After evaporating in a water jet vacuum the evaporation residue is crystallized twice, each time from 5 cc. of ethyl acetate. Pure 6-methoxy-4-acetyl-4H-thieno[2,3-b][1,4] benzothiazine has a melting point of 111–113°.

EXAMPLE 16

*6-trifluoromethyl-4H-thieno[2,3-b][1,4]benzothiazine*

(a) 2,2'-DIAMINO-4,4'-DITRIFLUOROMETHYL-DIPHENYL-DISULPHIDE 323 g. hydrazine hydrate are slowly added dropwise at reflux temperature to a mixture of 488.76 g. of 2,2' - dinitro-4,4'-ditrifluoromethyl-diphenyl-disulphide and 900 cc. of absolute ethanol. Boiling is subsequently effected for 5 hours. The reaction solution is evaporated in water jet vacuum at a bath temperature of 80°, 900 cc. of water are added to the residue and extraction is effected with a total of 1500 cc. of chloroform. After washing out the chloroform solution with 200 cc. of water the solution is evaporated and the evaporation residue distilled in a high vacuum. The main fraction which distils at 140–156° and 0.02 mm. of Hg is collected. After recrystallizing four times, each time from a 15-fold quantity of n-hexane, pure 2,2'-diamino-4,4'-ditrifluoro-methyl-diphenyl-disulphide, having a melting point of 77–78°, is obtained.

(b) (2-NITRO-3-THIENYL)-2-AMINO-4-TRIFLUORO-METHYL-PHENYL-SULPHIDE

A total of 235 g. of 3-bromo-2-nitro-thiophene (melting point 81–83°) is added portionwise at 60° to a solution of 217.7 g. of 2,2'-diamino-4,4'-ditrifluoromethyl-diphenyl-disulphide and 45.2 g. of sodium hydroxide in 1100 cc. of methanol and the mixture is kept at 60° for half an hour. Cooling, filtration and drying are effected. After recrystallizing thrice, each time from a 10-fold quantity of 80% aqueous ethanol, pure (2-nitro-3-thienyl)-2-amino-4-trifluoromethylphenyl-sulphide, having a melting point of 146–147°, is obtained.

(c) (2-NITRO-3-THIENYL)-2-FORMAMIDO-4-TRI-FLUOROMETHYL-PHENYL-SULPHIDE

A mixture of 200 g. of (2-nitro-3-thienyl)-2-amino-4-trifluoromethylphenyl-sulphide and 267 cc. of approximately 98% concentrated formic acid is boiled at reflux for 2 hours. Cooling, filtration and drying are effected. After recrystallizing thrice, each time from a 10-fold quantity of 4-methyl-pentanol-(2), pure (2-nitro-3-thienyl)-2-formamido-4-trifluoromethylphenyl-sulphide, having a decomposition point of 192°, results.

(d) 6-TRIFLUOROMETHYL-4H-THIENO[2,3-b][1,4] BENZOTHIAZINE

A solution of 35.0 g. of (2-nitro-3-thienyl)-2- formamido-4-trifluoromethyl-phenyl-sulphide in 100 cc. of dimethyl formamide is added dropwise whilst stirring during the course of 20 minutes at an internal temperature of 140° to a mixture of 90.0 g. of finely pulverized potassium carbonate, 2.0 g. of copper bronze and 150 cc. of dimethyl formamide and the mixture is immediately poured on 1.0 litre of water whilst warm, is cooled, filtered and dried. The crude material is boiled at reflux for half an hour with 500 cc. of chloroform, is filtered off and the filtrate is evaporated. After crystallizing thrice from chloroform pure 6 - trifluoromethyl-4H-thieno[2,3-b][1,-4]benzothiazine, having a melting point of 162–164°, is obtained.

EXAMPLE 17

*6-trifluoromethyl-4-acetyl-4H-thieno[2,3-b]-[1,4]benzothiazine*

2.0 g. of 6-trifluoromethyl-4H-thieno[2,3-b][1,4]benzothiazine and 3.36 g. of acetic anhydride are boiled at reflux for 3 hours at an oil bath temperature of 180°. After evaporating in a water jet vacuum the evaporation residue is crystallized from 150 cc. of low-boiling petroleum ether. Pure 6-trifluoromethyl - 4 - acetyl-4H-thieno[2,3-b][1,4]-benzothiazine has a melting point of 62–64°.

EXAMPLE 18

*6-cyano-4H-thieno[2,3-b][1,4]benzothiazine*

(a) (2-NITRO-3-THIENYL)-2-AMINO-4-CYANO-PHENYL-SULPHIDE 150 cc. of concentrated hydrochloric acid are added at room temperature to 16.9 g. of zinc salt of 3-amino-4-mercapto-benzonitrile. After filtration washing and drying are effected. A total of 16.9 g. of 3-bromo-2-nitro-thiophene (melting point 81–83°) is added portionwise at 60° to a mixture of 15.19 g. of the resulting 3-amino-4-mercapto-benzonitrile hydrochloride (melting point above 350°), 6.55 g. of sodium hydroxide and 120 cc. of methanol. The mixture is kept at 60° for half an hour. Cooling, filtration and drying are effected. After recrystallizing four times, each time from a 17-fold quantity of chlorobenzene, pure (2-nitro-3-thienyl)-2-amino-4-cyanophenylsulphide, having a decomposition point of 214°, is obtained.

(b) (2-NITRO-3-THIENYL)-2-FORMAMIDO-4-CYANOPHENYL-SULPHIDE

A mixture of 138.7 g. of (2-nitro-3-thienyl)-2-amino-4-cyanophenyl-sulphide and 950 cc. of approximately 98% concentrated formic acid is boiled at reflux for half an hour. Cooling, filtration and drying are effected. After recrystallizing twice, each time from a 40-fold quantity of methylisobutyl ketone, pure (2-nitro-3-thienyl)-2-formamido-4-cyanophenyl-sulphide, having a decomposition point of 213°, is obtained.

(c) 6-CYANO-4H-THIENO[2,3-b][1,4]BENZOTHIAZINE

A mixture of 30.0 g. of (2-nitro-3-thienyl)-2-formamido-4-cyanophenyl-sulphide, 90.0 g. of finely pulverized potassium carbonate, 2.0 g. of copper bronze and 250 cc. of dimethyl formamide is kept in an atmosphere of nitrogen gas at an oil bath temperature of 60° for 1 hour and 45 minutes and then at an oil bath temperature of 130° for 45 minutes. The reaction mixture is poured on 1.5 litres of water whilst warm, is cooled, filtered off and dried. The crude material is boiled at reflux for 2 hours with 500 cc. of chloroform, is filtered off and the filtrate is evaporated. After crystallizing thrice from chloroform recrystallization is effected once more from benzene, whereby pure 6-cyano-4H-thieno[2,3-b][1,4]benzothiazine, having a melting point of 160-162°, is obtained.

EXAMPLE 19

*6-cyano-4-acetyl-4H-thieno[2,3-b][1,4]benzothiazine*

1.0 g. of 6-cyano-4H-thieno[2,3-b][1,4]benzothiazine and 2.0 g. of acetic anhydride are boiled at reflux for 3 hours at an oil bath temperature of 180°. After evaporating in a water jet vacuum the evaporation residue is crystallized twice, each time from 10 cc of ethyl acetate. Pure 6-cyano-4-acetyl-4H-thieno[2,3-b][1,4]benzothiazine has a melting point of 158–160°.

EXAMPLE 20

*6-methylsulphonyl-4H-thieno[2,3-b][1,4]benzothiazine*

(a) 2,2'-DINITRO-4,4'-DIMETHYLSULPHONYL-DIPHENYL-DISULPHIDE

A mixture of 13.1 g. of sodium sulphide, 3.21 g. of sulphur powder and 95 cc. of absolute ethanol is boiled at reflux for 2 hours. After cooling to 30° this solution is slowly added dropwise at approximately 80° to a solution of 47.13 g. of 5-methylsulphonyl-2-chloro-nitro-benzene in 800 cc. of absolute ethanol. Boiling is subsequently effected for a further 2 hours. Cooling and filtration are effected and the moist residue is suspended in 800 cc. of water. Filtration, washing and drying are effected. After recrystallizing thrice, each time from a 20-fold quantity of diethyleneglycol-monomethyl ether, pure 2,2'-dinitro-4,4'-dimethylsulphonyl-diphenyl-disulphide, having a decomposition point of 274°, is obtained.

(b) 2,2'-DIAMINO-4,4'-DIMETHYLSULPHONYL-DIPHENYL-DISULPHIDE 356 g. of hydrazine hydrate are slowly added dropwise at reflux temperatre to a mixture of 563 g. of 2,2'-dinitro-4,4'-dimethulsulphonyl-diphenyl-disulphide and 2420 cc. of absolute ethanol. Boiling is subsequently effected for a further 5 hours. Cooling is effected, the pH value is adjusted to 5.1 with approximately 625 cc. of 10% hydrochloric acid, filtration and drying are effected. After recrystallizing four times from 80% aqueous ethanol (60–100-fold) pure 2,2'-diamino-4,4'-dimethylsulphonyl-diphenyl-disulphide, having a melting point of 196-197°, is obtained.

(c) (2-NITRO-3-THIENYL)-2-AMINO-4-METHYL-SULPHONYL-PHENYL-SULPHIDE

A total of 173 g. of 3-bromo-2-nitro-thiophene (melting point 81–83°) is added portionwise at 60° to a mixture of 168 g. of 2,2'-diamino-4,4',dimethylsulphonyl-diphenyl-disulphide and 33.6 g. of sodium hydroxide in 615 cc. of methanol and the mixture is kept at 60° for a further half hour. Cooling, filtration and drying are effected. After recrystallizing four times, each time from a 25-fold quantity of chlorobenzene, pure (2-nitro-3-thienyl)-2-amino-4-methylsulphonylphenyl - sulphide, having a decomposition point of 182°, is obtained.

(d) (2-NITRO-3-THIENYL)-2-FORMAMIDO-4-METHYL-SULPHONYL-PHENYL-SULPHIDE

A mixture of 165.2 g. of (2-nitro-3-thienyl)-2-amino-4-methylsulphonylphenyl-sulphide and 250 cc. of approximately 98% concentrated formic acid is boiled at reflux for half an hour. Cooling, filtration and drying are effected. After recrystallizing twice, each time from a 6-fold quantity of diethyleneglycol-monomethyl-ether, pure (2 - nitro - 3 - thienyl)-2-formamido-4-methyl-sulphonylphenyl-sulphide, having a decomposition point of 217°, is obtained.

(e) 6-METHYLSULPHONYL-4H-THIENO[2,3-b][1,4]BENZOTHIAZINE

A mixture of 20.0 g. of (2-nitro-3-thienyl)-2-formamido-4-methylsulphonylphenyl-sulphide, 60.0 g. of finely pulverized potassium carbonate, 1.5 g. of copper bronze and 200 cc. of dimethyl formamide is heated in an atmosphere of nitrogen gas in an oil bath to 100° for 20 minutes, to 120° for 15 minutes and to 140° for half an hour. The reaction mixture is poured on 1 litre of water whilst warm, is cooled, filtered and dried. The crude material is boiled at reflux for one hour with 300 cc. of chloroform, is filtered off and the filtrate is evaporated. Crystallization is effected twice from chloroform and once from isopropanol. The resulting pure 6-methylsulphonyl-4H-thieno[2,3-b][1,4]benzothiazine has a melting point of 203–205°.

EXAMPLE 21

*6-methylsulphonyl-4-acetyl-4H-thieno[2,3-b][1,4]benzothiazine*

1.0 g. of 6-methylsulphonyl-4H-thieno[2,3-b][1,4]benzothiazine and 1.62 g. of acetic anhydride are boiled at reflux at an oil bath temperature of 180° for 3 hours. After evaporating in a water jet vacuum the evaporation residue is crystallized twice, each time from 15 cc. of ethyl acetate. Pure 6-methylsulphonyl-4-acetyl-4H-thieno[2,3-b][1,4]benzothiazine has a melting point of 173-175°.

EXAMPLE 22

*4H-thieno[2,3-b][1,4]benzothiazine*

A mixture of 80 g. of (2-nitro-3-thienyl)-2-acetamido-phenyl-sulphide, 61 g. of finely pulverized sodium carbonate, 5 g. of copper bronze and 600 cc. of dimethyl formamide is heated in an atmopshere of nitrogen gas at an oil bath temperature of 150° for half an hour, i.e. until nitrogen monoxide evolution stops. The reaction mixture is poured on 2 litres of water whilst warm, is cooled, filtered off and dried. The crude material is extracted in a Soxhlet apparatus with 500 cc. of ether for 2½ hours. After evaporating the ether extract the evaporation residue is crystallized twice, each time from 125 cc. of chloroform. The resulting pure 4H-thieno[2,3-b][1,4]benzothiazine has a melting point of 134–137°.

EXAMPLE 23

*4H-thieno[2,3-b][1,4]benzothiazine*

(a) (2-NITRO-3-THIENYL)-2-FORMAMIDO-PHENYL-SULPHIDE

A mixture of 126 g. of (2-nitro-3-thienyl)-2-amino-phenyl-sulphide and 250 cc. of approximately 98% concentrated formic acid is boiled at reflux for half an hour. Cooling, filtration and drying are effected. After recrystallizing twice, each time from a 6-fold quantity of diethyleneglycol-monomethyl ether, (2-nitro-3-thienyl)-2-formamido-phenyl-sulphide, having a melting point of 190–193°, is obtained.

(b) 4H-THIENO[2,3-b][1,4]BENZOTHIAZINE

A solution of 3.2 g. of sodium hydroxide in 50 cc. of absolute ethanol is poured at room temperature into a suspension of 11.0 g. of (2-nitro-3-thienyl)-2-formamidophenyl-sulphide in 1 litre of acetone and stirring is effected for 10 minutes. The reaction mixture is then evaporated to a volume of approximately 500 cc. and is boiled at reflux for one hour. The mixture is then concentrated to a volume of 30 cc., 300 cc. of water and approximately 3 cc. of glacial acetic are added, filtration and drying are effected. The crude material is boiled at reflux for one hour with 500 cc. of ether, is filtered off and the filtrate is concentrated. After crystallizing the evaporation residue twice from chloroform pure 4H-thieno[2,3-b][1,4]benzothiazine, having a melting point of 134–137°, is obtained.

EXAMPLE 24

*6-methylsulphonyl-4H-thieno[2,3-b][1,4]benzothiazine*

A mixture of 20.0 g. of (2-nitro-3-thienyl)-2-formamido-4-methylsulphonylphenyl-sulphide, 36.0 g. of finely pulverized sodium carbonate, 1.5 g. of copper bronze and 200 cc. of dimethyl formamide is heated in an atmosphere of nitrogen gas in an oil bath to 100° for 20 minutes, to 120° for 15 minutes and to 140° for half an hour. The reaction mixture is poured on one litre of water whilst warm, is cooled, filtered off and dried. The crude material is boiled at reflux for one hour with 300 cc. of chloroform, is filtered off and the filtrate is evaporated. Crystallization is effected twice from chloroform and once from isopropanol. The resulting pure 6-methylsulphonyl-4H-thieno[2,3-b][1,4]benzothiazine has a melting point of 203–205°.

What is claimed is:
1. A compound of the formula:

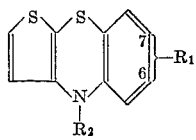

in which
$R_1$ is hydrogen, chlorine, bromine, alkoxy ($C_1$–$C_4$), alkylmercapto ($C_1$–$C_4$), alkylsulphonyl ($C_1$–$C_4$), alkylsulphinyl ($C_1$–$C_4$), aliphatic acyl of 2 to 4 carbon atoms inclusive, trifluoromethyl or cyano, and $R_2$ is hydrogen, aliphatic acyl of 1 to 4 carbon atoms inclusive or benzoyl.
2. 4H-thieno[2,3-b][1,4]benzothiazine.
3. 4-acetyl-4H-thieno[2,3-b][1,4]benzothiazine.
4. 6-chloro-4H-thieno[2,3-b][1,4]benzothiazine.
5. 6 - chloro - 4 - acetyl-4H-thieno[2,3-b][1,4]benzothiazine.
6. 6 - methylmercapto - 4H - thieno[2,3-b][1,4]benzothiazine.
7. 6 - methylmercapto - 4 - acetyl - 4H-thieno[2,3-b][1,4]benzothiazine.
8. 7-bromo-4H-thieno[2,3-b][1,4]benzothiazine.
9. 7 - bromo - 4 - acetyl - 4H-thieno[2,3-b][1,4]benzothiazine.
10. 7-chloro-4H-thieno[2,3-b][1,4]benzothiazine.
11. 7 - chloro - 4 - acetyl - 4H-thieno[2,3-b][1,4]benzothiazine.
12. 6 - methylsulphinyl - 4H - thieno[2,3-b][1,4]benzothiazine.
13. 6-bromo-4H-thieno[2,3-b][1,4]benzothiazine.
14. 6 - bromo - 4 - acetyl-4H-thieno[2,3-b][1,4]benzothiazine.
15. 6-methoxy-4H-thieno[2,3-b][1,4]benzothiazine.
16. 6 - methoxy - 4 - acetyl - 4H-thieno[2,3-b][1,4]benzothiazine.
17. 6 - trifluoromethyl - 4H - thieno[2,3-b][1,4]benzothiazine.
18. 6 - trifluoromethyl - 4 - acetyl - 4H-thieno[2,3-b][1,4]benzothiazine.
19. 6-cyano-4H-thieno[2,3-b][1,4]benzothiazine.
20. 6 - cyano - 4 - acetyl-4H-thieno[2,3-b][1,4]benzothiazine.
21. 6 - methylsulphonyl - 4H-thieno[2,3-b][1,4]benzothiazine.
22. 6 - methylsulphinyl - 4 - acetyl-4H-thieno[2,3-b][1,4]benzothiazine.
23. 6 - methylsulphonyl - 4 - acetyl - 4H-thieno[2,3-b][1,4]benzothiazine.

References Cited

UNITED STATES PATENTS

| 2,461,460 | 2/1949 | Winnek | 260—243 |
| 2,997,468 | 8/1961 | Schwartz | 260—243 |

OTHER REFERENCES

Baltzley et al.: J. Amer. Chem. Soc., vol. 68, pp. 2673–8 (1946).

WALTER A. MODANCE, *Primary Examiner.*

JOHN M. FORD, *Assistant Examiner.*